United States Patent [19]

Newman

[11] 4,030,127

[45] June 14, 1977

[54] AUDIO TAPE PLAYER DRIVER INFORMATION DEVICE

[76] Inventor: Harry Newman, Main St., Box 141, South Fallsburg, N.Y. 12779

[22] Filed: May 14, 1975

[21] Appl. No.: 577,313

[52] U.S. Cl. .................................. 360/12; 360/1; 360/74

[51] Int. Cl.² ..................... G11B 5/00; G11B 15/06

[58] Field of Search ............ 360/6, 12, 74, 96, 132, 360/1, 137; 35/35

[56] References Cited

UNITED STATES PATENTS

| | | | |
|---|---|---|---|
| 3,495,229 | 2/1970 | Kuehnle | 360/74 |
| 3,512,784 | 5/1970 | Yamamoto | 360/74 |
| 3,558,142 | 1/1971 | Poessel | 360/132 |
| 3,596,010 | 7/1971 | Patterson | 360/74 |
| 3,638,955 | 2/1972 | Wada | 360/96 |
| 3,654,618 | 4/1972 | Kanda | 360/74 |
| 3,708,632 | 1/1973 | Parilla | 360/74 |

Primary Examiner—Jay P. Lucas
Attorney, Agent, or Firm—Smythe & Moore

[57] ABSTRACT

An apparatus for providing information, for example, tourist information, comprising a sound reproducing device which can receive a prerecorded tape, such as a cassette, having informative touring information for a specific location, the apparatus being manually energizable and being shut off at predetermined points by the tape. The tape can have numbers thereon viewable by the operator and for indicating the road exit or location.

2 Claims, 8 Drawing Figures

AUDIO TAPE PLAYER DRIVER INFORMATION DEVICE

This invention relates to an audio tape device for imparting information to a listener relative to a particular area involved or other desired information for various purposes.

When motoring or touring, it frequently becomes desirable to be informed as to routes and matters of interest. Hitherto, this has been accomplished primarily through printed information on road maps, strip maps or other similar means. Such can be distracting or requries a person other than the driver to impart the information to the driver. Various types of audio tape devices have been previously used for different purposes but these have not been convenient to use for the purpose of this invention.

One of the objects of the invention is to provide an audio tape device particularly useful for furnishing touring or similar information to a listener.

Another of the objects of the invention is to provide an improved arrangement for starting, stopping and indexing an audio tape device.

In one aspect of the invention, an audio tape player can be arranged to receive a prerecorded cassette or tape holder, the tape having information thereon, such as instructions about a road exit, or the tape can have other information thereon. The tape also has viewable indicia or information thereon. The player is arranged to transport the tape past a transducer which is connected to a loudspeaker. The tape transport mechanism is energizable by a manually operable start circuit which has means to lock it in playing position until a signal is received from the tape for stopping the transport. The signal is arranged to stop the tape so that the indicia on the tape will be viewable by the user.

Other objects, advantages and features of the invention will become apparent from the following description and drawings which are merely exemplary.

In the drawings.

Where appropriate, the same reference numerals will be used to indicate the same or equivalent parts in the various drawings.

Figure 1:
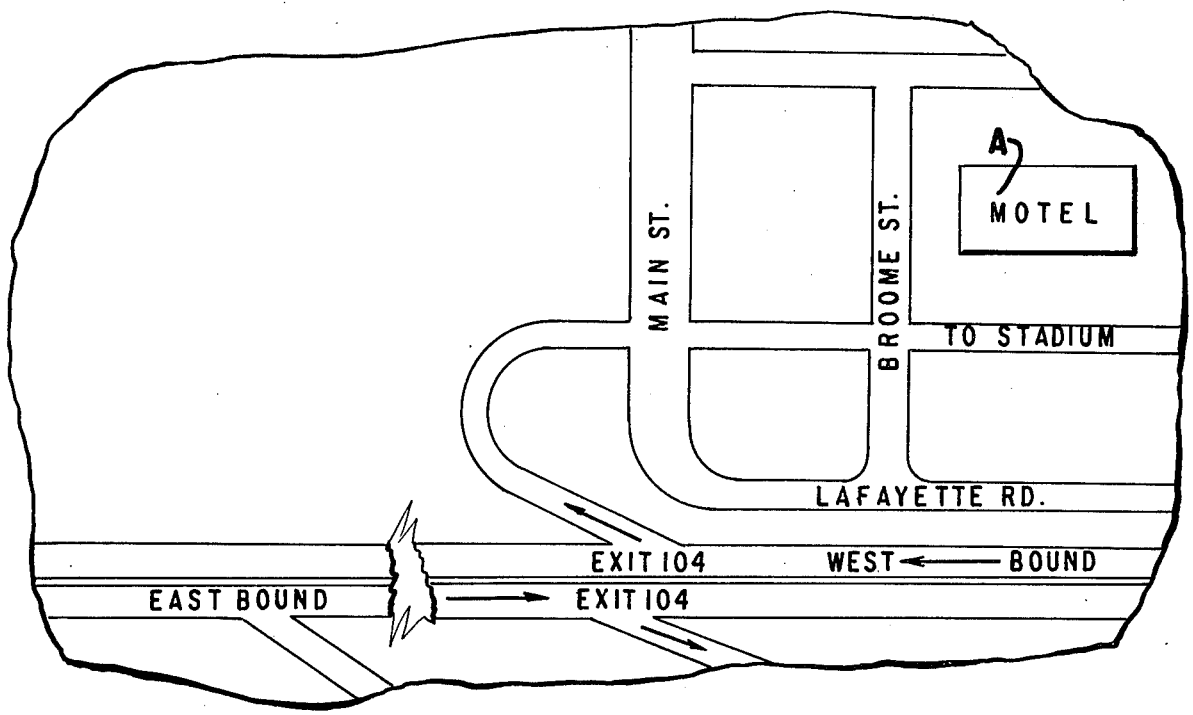
FIG. 1 is a schematic map to illustrate one use of the invention.

When touring or traveling, it is desirous to have instructions, directions or local information. As an example, when reaching Exit 104 (FIG. 1), and it is intended to go to motel A (FIG. 1), it would be convenient to have clear instructions as to how to reach the same. An audio-tape player and appropriate prerecorded tape or cassette could be obtained from a place, such as a previously reached service station, which would provide instructions when reaching Exit 104. The tape player can be furnished by a service station or can be located in the automobile. Arrangments of various sorts can be made so that the tape can be exchanged or turned in after its use and the next one picked up. The tape also could have on it instructions as to Exit 110 when it is reached, the player having stopped after providing instructions in regard to Motel A, and then restarted after the vehicle re-enters the highway.

Figure 2:
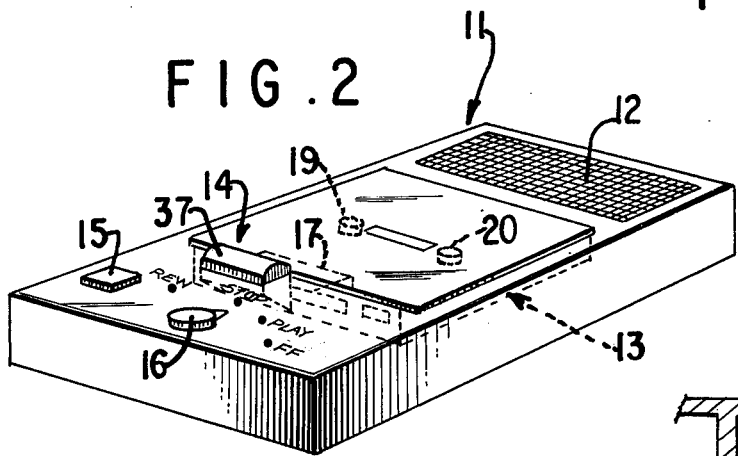
FIG. 2 is a perspective view of one form of the invention.

One type of tape player is shown generally at 11 (FIG. 2) having a speaker 12 and arranged to receive a tape cassette 13. There can be a viewing window 14 for displaying indicia, such as "Exit 104." A conventional tape transport mechanism, not shown, is located within the player 11, such being started by depressing button 15, which will be described hereafter. Control 16 can be used to control direction or travel of the tape. A conventional transducer 17 is located next to the tape so that energy can be picked up therefrom for operating speaker 12.

The tape 18 (FIG. 3) can be carried in a cassette or holder which can be turned over to reverse as is known in the art. Such a cassette has reels (not shown) rotatable on axes 19, 20 which are driven by conventional motor means in the player controlled by button 15 and switch 16. Although not preferred, reel-to-reel cartridges also could be used.

Figure 3:
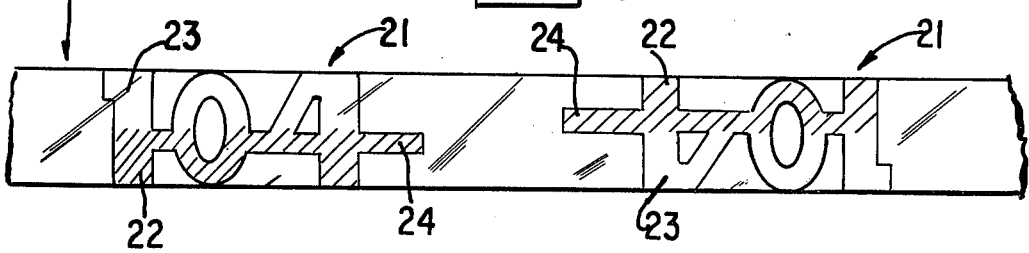
FIG. 3 is a fragmentary view of a tape which can be used.

The tape has numerals thereon, such as seen in FIG. 3 at 21, the numerals being on transparent portions of the tape. The lower half 22 of the numeral is metallized or conductive and the upper portion 23 is of insulative material or has insulative material thereon. There is an extended conductive portion 24 for the purpose of insuring that the numeral will travel to a position so that it will appear in the viewing window, such allowing for momentum after the player has been signalled to stop.

Messages or informative material can be placed on the tape at spaced intervals with related indicia.

Figure 4:
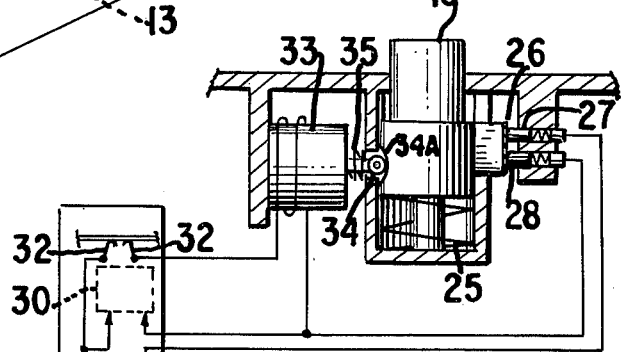
FIG. 4 is a schematic wiring diagram of one form of control.

Referring to FIG. 4, start button 15 is shown in a down or activated position. When the button is pressed down or inwardly against spring 25, contact or switch plate 26 moves therewith so as to complete the circuit between contacts 27, 28. Closing of contacts 27, 28 will energize tape transport motor 29 and the tape player apparatus 30.

When the player is at rest, switches or wiper contacts 32, 32 (FIGS. 4, 5) will be bridged by the metallic or conductive portion on the tape. The contacts can be urged against a vertical portion of the tape.

The tape was previously stopped as the tape moved to the selected position so that the indicia will be viewable because solenoid 33 was previously energized by the conductive portion to withdraw latch 34 against pressure of spring 35 to permit button 15 to move upwardly under urgence of spring 25 to open the bridge between contacts 27, 28.

The tape will start to move when the button 15 is depressed. The circuit to solenoid then will be activated as a metallized or conductive portion of the tape is removed from contact with wipers 32, 32. After the button has been pressed inwardly and the power supply 31 removed from solenoid 33, spring 35 will cause latch 34 to move into a notch 34A in the button to hold it in tape player operating condition.

After completion of the message, contacts 32, 32 and the metallized portion of the next indicia will unlatch button 15 so the tape player and tape will stop in the viewing window with the next exit or place indicated therein.

A viewer can be employed to reflect the indicia or numeral by means of a prism or suitable optical means to enlarge the same.

The viewing means can be in the wall of the player. In this form, a reflective mirror 36 (FIG. 5) with an adjacent prism 37 for enlarging the numeral can be located so as to pick up the reflection of the indicia and to enlarge it so that it can be readily viewed by the user. It should be apparent that the viewing arrangement could be integral with the cassette (not shown) or take other forms.

Figure 6:
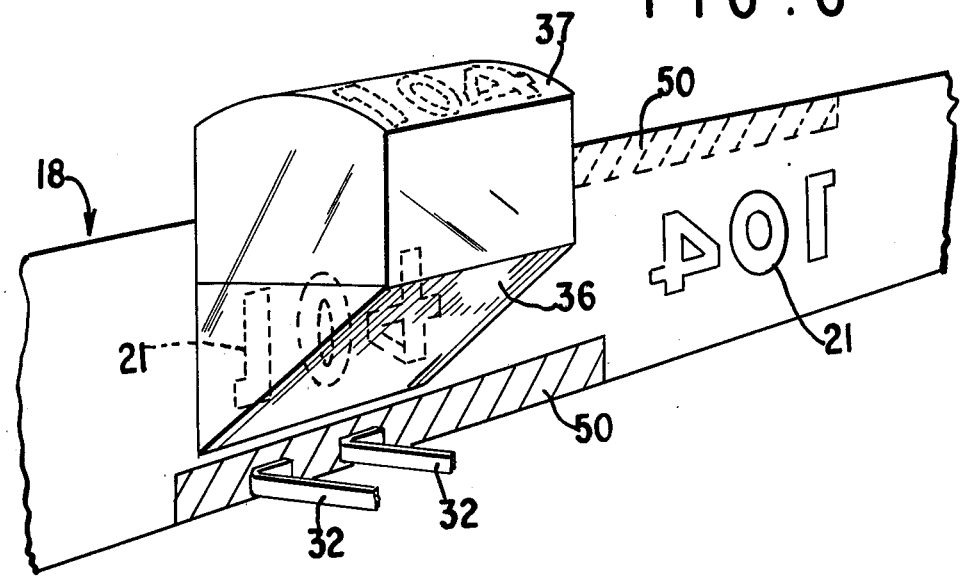
FIG. 6 is a fragmentary perspective view of another form of tape and viewer in relation to a viewer.
Figure 5:
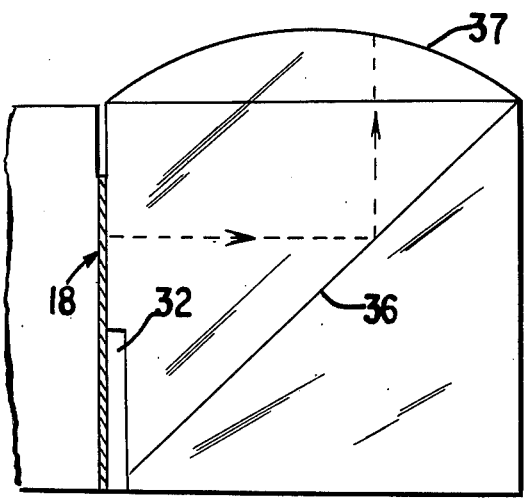
FIG. 5 is a fragmentary sectional view of a viewing arrangement for the indicia.

Another form of control strip and viewer is shown in FIG. 6 wherein the tape has a conductive strip 50 along the bottom which can be contacted by wipers 32, 32. In FIG. 5, the wipers are vertically extended so as to make contact with the conductive half of the numeral or indicia. The wipers can be so located relative to the viewing so as not to interfere.

Figure 7:
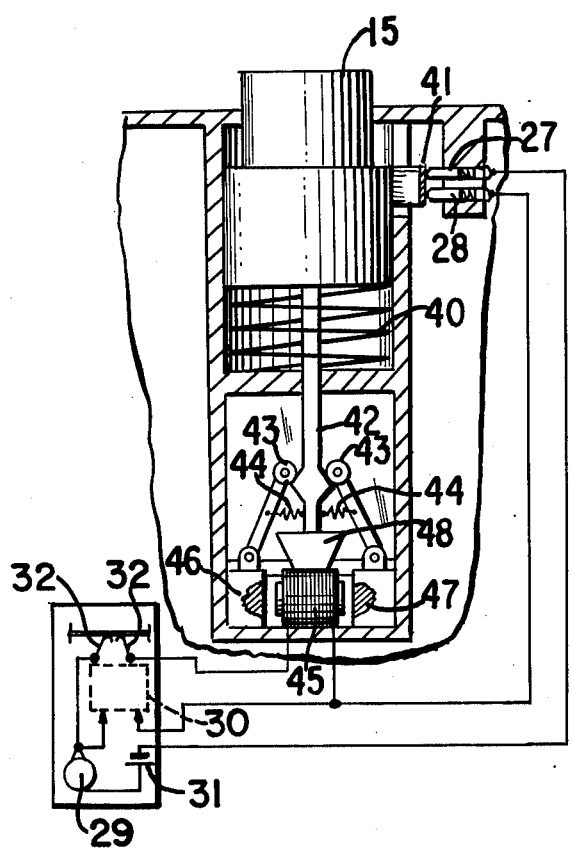
FIG. 7 is a sectional view of another type of control which can be used.

Another form of control switch is shown in FIG. 7 wherein button 15 is depressed against spring 40 so that switch plate 41 closes or bridges the circuit between contacts 27, 28 which then function in the same manner as described for FIG. 4 to energize the tape player.

As the button 15 is depressed, prong 42 moves down so as to open prong holders or latches 43. Coil or suitable springs 44 will press prong latches 43 into prong gripping position so as to lock prong 42 in down position and keep the circuit energized through switch plate 41. When the conductive portion of the tape again closes a circuit across wipers 32, 32, solenoid 45 will be energized which will cause armatures 46, 47 carrying the latches 43 to move inwardly against wedge 48 so that the latches 43 rotate and release prong 42. Spring 40 then causes the button 15 to move upwardly and stop the cassette or tape. Closing of contacts 27, 28 will energize tape transport motor 29 and the tape player apparatus 30, as hereinbefore described.

Figure 8:
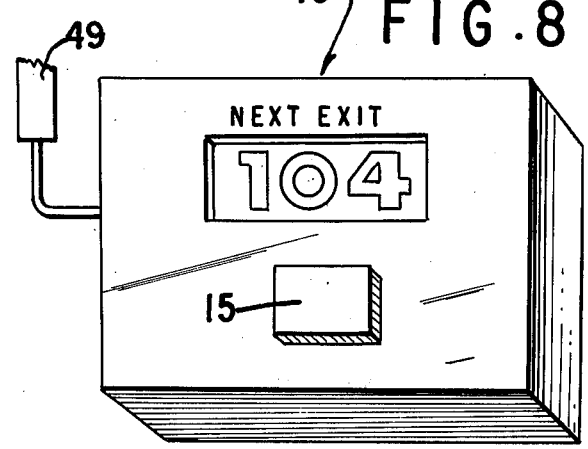
FIG. 8 is a perspective view of another form of player.

A still further form of tape player 48 is illustrated in FIG. 8 which can have a connection 49 pluggable into the cigarette lighter connection or other connection of the vehicle.

The tape shown in FIGS. 3 and 6 is arranged so that it forms a two track tape in the cassette so that the cassette can be reversed. This requires reversal of the indicia as needed. By placing the desired information on the tape, reversal thereof can be utilized to give information for returning. The messages for this purpose can be taped at equal intervals.

It should be apparent that details of construction can be varied and the principles of the invention used for various purposes without departing from the spirit of the invention except as defined in the appended claims.

What is claimed is:

1. In an audio tape device having a speaker and an audio tape energized transducer means connected to said speaker for providing a prerecorded informative message to a listener, the combination including means for receiving a reversable two track audio tape having reversed indicia and spaced information thereon for energizing said speaker when said tape is moved relative to said transducer, transport means for moving said tape relative to said transducer, manual reciprocable button means for energizing said transport means, said manual means having solenoid releasable locking means effective for one track only for holding said manual means in a tape device energized mode after said manual means is moved to energize said transport means, and portions of said tape indicia being insulative and portions being electrically conductive for releasing said locking means at the end of a message, and optical viewing means including a reflective mirror and adjacent prism means whereby the indicia is reflected by said mirror for enlarging by and viewing through said prism.

2. In an audio tape device as claimed in claim 1 wherein said button has a prong extending therefrom and said releasable locking means includes a pair of oscillatable latches for holding said prong in a latched position.

* * * * *